US006877557B2

(12) United States Patent
Richards et al.

(10) Patent No.: US 6,877,557 B2
(45) Date of Patent: Apr. 12, 2005

(54) IN-WELL MONITORING AND FLOW CONTROL SYSTEM

(75) Inventors: Andrew Richards, Banchory (GB); William George Nigel Parkinson Webster, Aberdeen (GB)

(73) Assignee: Expro North Sea Ltd., Aberdeen (GB)

( * ) Notice: Subject to any disclaimer, the term of this patent is extended or adjusted under 35 U.S.C. 154(b) by 130 days.

(21) Appl. No.: 10/221,054

(22) PCT Filed: Mar. 6, 2001

(86) PCT No.: PCT/GB01/00943

§ 371 (c)(1),
(2), (4) Date: Feb. 26, 2003

(87) PCT Pub. No.: WO01/67466

PCT Pub. Date: Sep. 13, 2001

(65) Prior Publication Data

US 2003/0155120 A1 Aug. 21, 2003

(30) Foreign Application Priority Data

Mar. 9, 2000 (GB) .............................. 0005631

(51) Int. Cl.[7] .............................................. E21B 47/00
(52) U.S. Cl. ................ 166/250.01; 166/373; 166/66.6; 318/617
(58) Field of Search .......................... 166/250.01, 254.2, 166/373, 65.1, 66.6; 318/254, 439, 617, 632

(56) References Cited

U.S. PATENT DOCUMENTS

| 3,187,301 | A |   | 6/1965  | Summers ..................... 340/18 |
| 3,518,679 | A |   | 6/1970  | Baldwin et al. ............... 340/18 |
| 3,596,511 | A | * | 8/1971  | Hart ........................ 73/864.44 |
| 4,077,022 | A |   | 2/1978  | Pitts, Jr. ........................ 333/1 |
| 4,788,545 | A |   | 11/1988 | Farque ........................ 340/856 |
| 5,172,717 | A |   | 12/1992 | Boyle et al. ................. 137/155 |
| 5,521,592 | A |   | 5/1996  | Veneruso ................. 340/854.8 |
| 5,831,156 | A |   | 11/1998 | Mullins .................... 73/152.18 |
| 6,424,105 | B1 | * | 7/2002 | Breit et al. ................. 318/254 |

FOREIGN PATENT DOCUMENTS

GB          2310986         9/1997

* cited by examiner

Primary Examiner—Roger Schoeppel
(74) Attorney, Agent, or Firm—Gifford, Krass, Groh, Sprinkle, Anderson & Citkowski, P.C.

(57) ABSTRACT

An in-well monitoring and flow control system with an improved power supply. A separate high voltage (18) and low voltage power supply (23) is provided together with a cable (14) which has at least two separate cores; one core (24) for high voltage power and the other core (26) for low voltage power and control monitoring communications.

22 Claims, 2 Drawing Sheets

IN-WELL MONITORING AND FLOW CONTROL SYSTEM

FIELD OF THE INVENTION

The present invention relates to control and monitoring systems for wells and particularly, but not exclusively, for hydraulic control of downhole flow control systems. The invention also relates to an in-well power supply for use with an in-well flow control and monitoring system.

BACKGROUND OF THE INVENTION

Control systems for providing hydraulic control of valves from the surface are known. One example is the PES "SCRAMS" system which provides electro-hydraulic control of in-well valves from the surface. This system has solenoids which are supplied at a voltage of 120 volts for operating valves at 3,000 to 4,000 psi. Other systems are based on using electrical energy only to control valve operation and do not require hydraulic control. This means that a higher voltage, for example, 400 DC is needed to generate sufficient power to operate the valves. In practice, this is achieved by the use of a downhole power supply system incorporating high power electronic components in the downhole tool.

It is well known that downhole valves and monitoring systems have to operate at high temperatures. Electronic components operating at high temperatures are often prone to failure. This is because most normal electronic components are designed to operate at temperatures well below most oil/gas well temperatures, and the mean time below failure (MTBF) of the components falls rapidly as the environmental temperature which the components are exposed to, exceeds the design temperature. This problem is particularly acute where high voltage/currents are applied due to high electrical stresses and the operation of additional local heat by the components.

In some existing systems the size of the cable, and the conductors within the cable also limits the power which can be supplied to the cable and consequently increasing the power supply to the downhole control system has been problematic. Increasing the cross-section of the cable can result in a much more expensive cable, which is difficult to obtain and to integrate with existing systems, which require a "standard" cable size to be used.

In addition, with existing systems there is a limit to the number of devices or valves which can be driven from a single power supply. The current limit is about four to five devices and also the maximum power which can be used with the electrical only supply is about 400 volts DC. This makes it difficult to use valves above a certain size which may be required in a certain situation. Also, existing systems cannot power-up during deployment for safety reasons which means that it is not possible to monitor the downhole valves during deployment.

An object of the present invention is to provide an improved control and monitoring system for wells which obviates or mitigates at least one of the disadvantages associated with existing systems.

A further object of the present invention is to provide an improved power supply for use with an in-well flow control system which obviates or mitigates at least one disadvantage associated with existing power supplies.

SUMMARY OF THE INVENTION

This is achieved by providing separate high voltage and low voltage power supplies and a cable which has at least two separate cores; one core for high voltage power and the other core for low voltage power and control monitoring communications.

This solution provides a number of advantages over the aforementioned prior art arrangements. Firstly, the maximum high power which can be used is not limited to 400 volts; and the system can be used for up to 255 downhole devices. A further advantage is that voltage can be varied at surface to suit the downhole hardware and the system can be powered up during deployment because the low voltage line can be used to continuously monitor what is happening downhole. A yet further advantage is that the position of a downhole component such as a valve can be monitored and high voltage power supplied to make further movements. The cable sheathing is used as the earth return in shallower wells providing the advantage that a separate earth is not needed for shallower wells. A shallow well may be considered as one less than 4,000 feet. However, for deeper wells, in excess of 4,000 feet, the resistance of the armoured cable may be too high to provide a satisfactory return path and, in such a case, a cable with three cores is used; one for high voltage power, one for low voltage and one for an earth return.

According to a first aspect of the present invention there is provided an in-well flow control and monitoring system for controlling a plurality of electrically operable downhole elements from a surface power supply, said system comprising:

a high voltage power supply;

a low voltage power supply;

at least one high voltage downhole component and at least one low voltage downhole component;

a cable having at least two separate conductors and an earth return, a first conductor for coupling the high voltage power supply to the at least one high voltage component and a second conductor for connecting the low voltage power supply to the at least one low voltage component, monitoring means coupled to at least one high voltage downhole component for monitoring when a high voltage is required to actuate said downhole component, and means for supplying said high voltage to said high voltage component in response to a signal from said monitoring means.

Preferably the earth return is provided by the cable sheathing. Alternatively the earth return is provided by a separate conductor within the cable so that said cable has three separate conductors; a high voltage power supply conductor; a low voltage conductor, and an earth return conductor.

Preferably, the high voltage power supply is greater than 400 volts DC. Preferably the control and monitoring system can be addressed from the surface allowing a plurality of sensors and valve controllers to be coupled to the same conductor. This arrangement also allows multiple flow control devices to be coupled to the conductor carrying high voltage. Conveniently the flow control and monitoring system can be used to control up to 255 downhole elements, from said same conductor and supplied by same power supply.

Preferably also, the high voltage power supply can be varied at surface to suit various downhole hardware.

Conveniently, said low voltage monitoring means for monitoring said high voltage downhole component is coupled to a position transducer for monitoring the position of the high voltage downhole component. Conveniently the high voltage downhole component is a valve which has a valve element which is rotatable between an open and a closed position. Conveniently the transducer is an optical transducer for optically monitoring the position of said downhole valve element.

According to a further aspect of the present invention there is provided a method of operating an in-well flow control system having a plurality of downhole low voltage components, said method comprising the steps of, providing separate high voltage and low voltage power supplies, coupling said high voltage and low voltage power supplies to respective said downhole high voltage components and said low voltage components over separate electrical conductors, monitoring said high voltage components to determine the requirement for high voltage to be supplied and providing a monitoring signal indicative of whether power is required, and supplying high voltage to said high voltage downhole components when said monitoring signal indicates high voltage is required.

Preferably the method includes the step of using the cable sheath as the earth return. Alternatively the method includes the step of using a separate conductor within the cable as the earth return.

Conveniently, when the downhole component is a valve with a valve element, the method includes the step of monitoring the position of the valve element to determine the requirement for high voltage power to be supplied to said downhole component.

Preferably, also the method includes the step of providing a variable surface power supply for varying the power at surface to the downhole high voltage and low voltage power supplies.

Preferably also, the method includes the step of continuously monitoring the position of the valve element using the low voltage line during deployment of the high voltage downhole component.

Preferably also, the method includes the step of scaling the surface high voltage power supply on demand to increase power to its said high voltage downhole components.

According to a further aspect of the present invention there is provided a power supply for use with an in-well flow control and monitoring system, said power supply comprising:

a separate high voltage power supply;

a separate low voltage power supply;

a cable having at least two separate conductors, a first conductor for coupling the high voltage power supply to high voltage components disposed downhole, and a second conductor for connecting the low voltage power supply to low voltage components disposed downhole.

Preferably said cable has a conductive sheath which is used as an earth return for shallower wells. Alternatively said cable has a separate conductor which is used as an earth return for deep wells.

Preferably, said high voltage power supply is scalable and should provide increased high voltages on demand. Conveniently also, said high voltage power supply is variable at surface to vary the power supplied to the downhole components.

According to a further aspect of the invention there is provided a monitoring system for simultaneous monitoring high data rate and low data signals from downhole sensors, said system comprising:

a high data rate system configuration;

a low data rate system configuration;

a cable for use by said high data rate configuration and said low data rate configuration, said cable comprising a conductive sheath, a first conductor for carrying a low voltage supply and low data rate signals, at least two second conductors for carrying a low voltage supply and high data rate signals, the high date rate system configuration having a surface control unit coupled to at least one high data rate downhole monitoring system by said at least two second conductors;

the low data rate system configuration having a surface control unit coupled to at least one low data rate downhole monitoring node system by said first conductor, said conductive sheath being an earth return for low voltage power supplies for the high data rate low data rate system configurations.

Preferably, the cable has three conductors and a conductive armoured sheath.

BRIEF DESCRIPTION OF THE DRAWINGS

These and other aspects of the invention become apparent from the following description when taken in combination with the accompanying drawings in which.

DETAILED DESCRIPTION OF THE PREFERRED EMBODIMENTS

Figure 1:
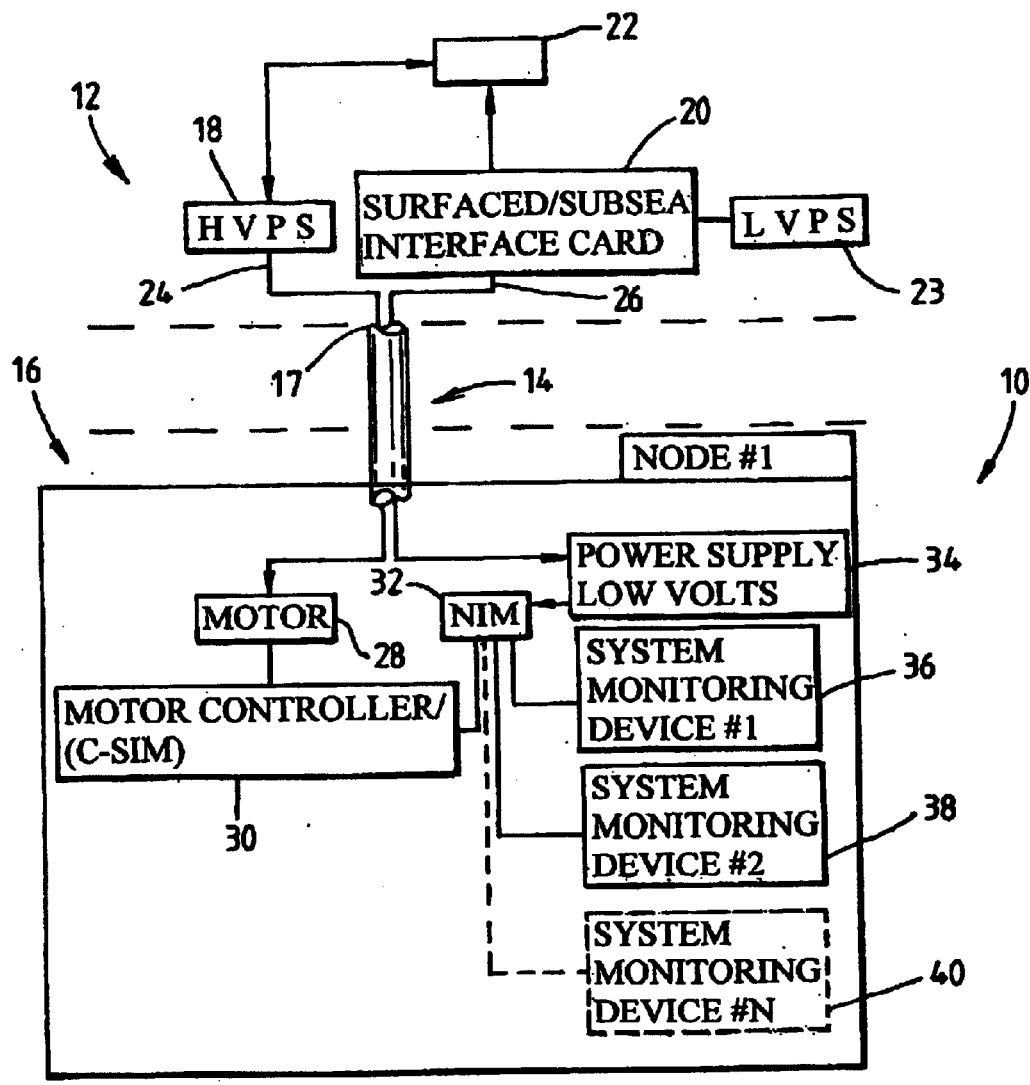
FIG. 1 is a schematic block diagram of an in-well flow control system for high voltage power distribution to a number of flow control devices with feedback and monitoring in accordance with an embodiment of the present invention used for shallow wells.

Reference is now made to FIG. 1 which depicts an in-well flow control system, generally indicated by reference numeral 10, which includes a surface portion 12 connected by a cable 14 to a downhole node #1, generally indicated by reference numeral 16. It will be understood that, in this embodiment, node 16 is only one node of 255 nodes which are connected to the surface portion 12.

The surface portion 12 has a 400 volt DC high voltage power supply (HVPS) 18 which is used to supply current up to 5 amps power downhole electronics in the nodes 16, on surface/subsea interface card 20 which are both coupled to a computer controlled data acquisition and command module (CCDACM) 22 which utilises Expro proprietary control and monitoring software (MZS) and a low voltage power supply (LVPS) 23 coupled to the interface card 20. The high voltage power supply 18 and subsea interface card 20 are coupled via cable 14 to the node 16. The surface/subsea interface card provides low voltage power, usually less than 100 V, and routes commands from CCDACM 22 and data to the cable 14. The CCDACM unit 22 allows control of high voltage and low voltage surface power supplies and sends commands to downhole addressable device and surface devices. The unit 22 acquires data feedback sent to the surface from downhole devices. The cable 14 is a dual conductor cable with an armoured sheath 17. One conductor 24 is used to carry high voltage power supply signals from the power supply to the downhole motor and the other conductor 26 carries low voltage power and communications signals between the monitoring and sensing equipment and the interface card 20, as will be explained below. The armoured sheath 17 is used as an earth return for both the high voltage and low voltage lines because in the embodiment of FIG. 1 the well is less than 4,000 feet deep so that the resistance of the armoured sheath is low enough to provide a satisfactory current return path.

The downhole node 16 is coupled to a downhole flow control component which is a valve with a rotatable valve element (not shown). The node 16 includes a motor 28 for moving the valve element between an open and a closed position. The motor 28 actuates the valve element under control of motor controller 30. The low voltage power supply 23 is coupled to a Node Interface Manager (NIM) unit 32 which is an Expro proprietary modem for sending/receiving commands and data. The NIM unit 32 is coupled to a node low voltage power supply 34 and to system monitoring submode devices #1, #2 to #n denoted by response numerals 36, 38 and 40 respectively.

The high voltage power supply 18 is connected to the downhole motor 28 via the cable conductor 24. However, the high voltage power supply 18 is only supplies power to the motor 28 when there is a need to move the valve element. In this regard, the position of the valve is predetermined by the motor controller and a signal from the motor controller 30 is sent when the motor 28 is to be moved. Similarly, a signal is sent to the interface card 20 indicating the position of the valve element and the data acquisition and command module 22 sends a signal to the high voltage power supply 18 to supply high voltage power to the motor 28 only when the valve requires to be moved. This means that high voltage is only supplied to the motor 30 when required and means that the downhole electronic components are not stressed by continuous application of high voltage, thereby minimising the likelihood of component failure and making the power supply last longer. A further advantage of this arrangement is that a digital address protocol (e.g., Standard Modbus, IEEE Standard, PROFIBUS) is used. Also high voltage power is supplied to respective valves only when required by these valves. This provides a more efficient system which permits a single high voltage power supply to supply 256 downhole nodes.

Figure 2:
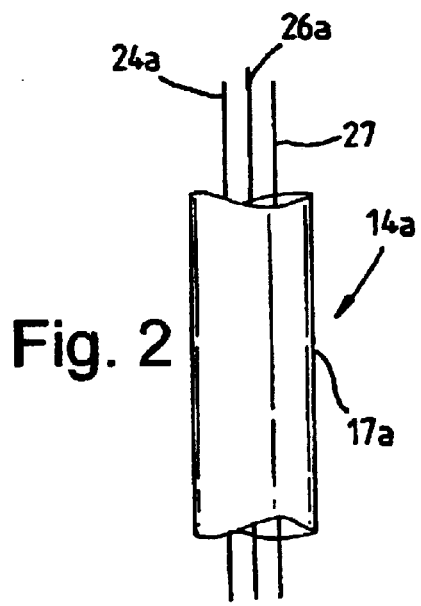
FIG. 2 is a detailed view of an alternative cable to that shown in FIG. 1 with a separate earth return conductor for use with the system of FIG. 1 in deeper wells and for use with simultaneous high data rate and low data rate downhole systems.

Reference is now made to FIG. 2 of the drawings which shows an alternative cable 14a which has three conductors: one high voltage conductor 24a, one low voltage conductor 26a and a separate earth return conductor 27. This alternative cable is used for deeper wells, especially in excess of 4,000 feet because the resistance of the armoured sheath 17a may become too high for an effective return path. It will be appreciated that the high voltage power supply may be set at any suitable value, such as 250 volts, 400 volts or higher. The exact high voltage value can be selected to suit downhole hardware.

The alternative cable 14a shown in FIG. 2 may be used in another application for providing a connection to surface for a simultaneous high data rate monitoring and low data rate monitoring downhole system. In this application conductor 27 carries a low voltage supply from the surface, command signals from the surface and downhole data to the surface. This is done at data rates generally less than 10 kilobits/second which is suitable for pressure, temperature and flow signals etc. Conductors 24a,26a are for use with high data rate systems such as seismic systems and carry command and data information between well sensors and the surface. Conductors 24a,26a also carry a low voltage supply from the surface. The conductive armoured sheath 17a is used as the earth return for the low voltage system.

Figure 3:
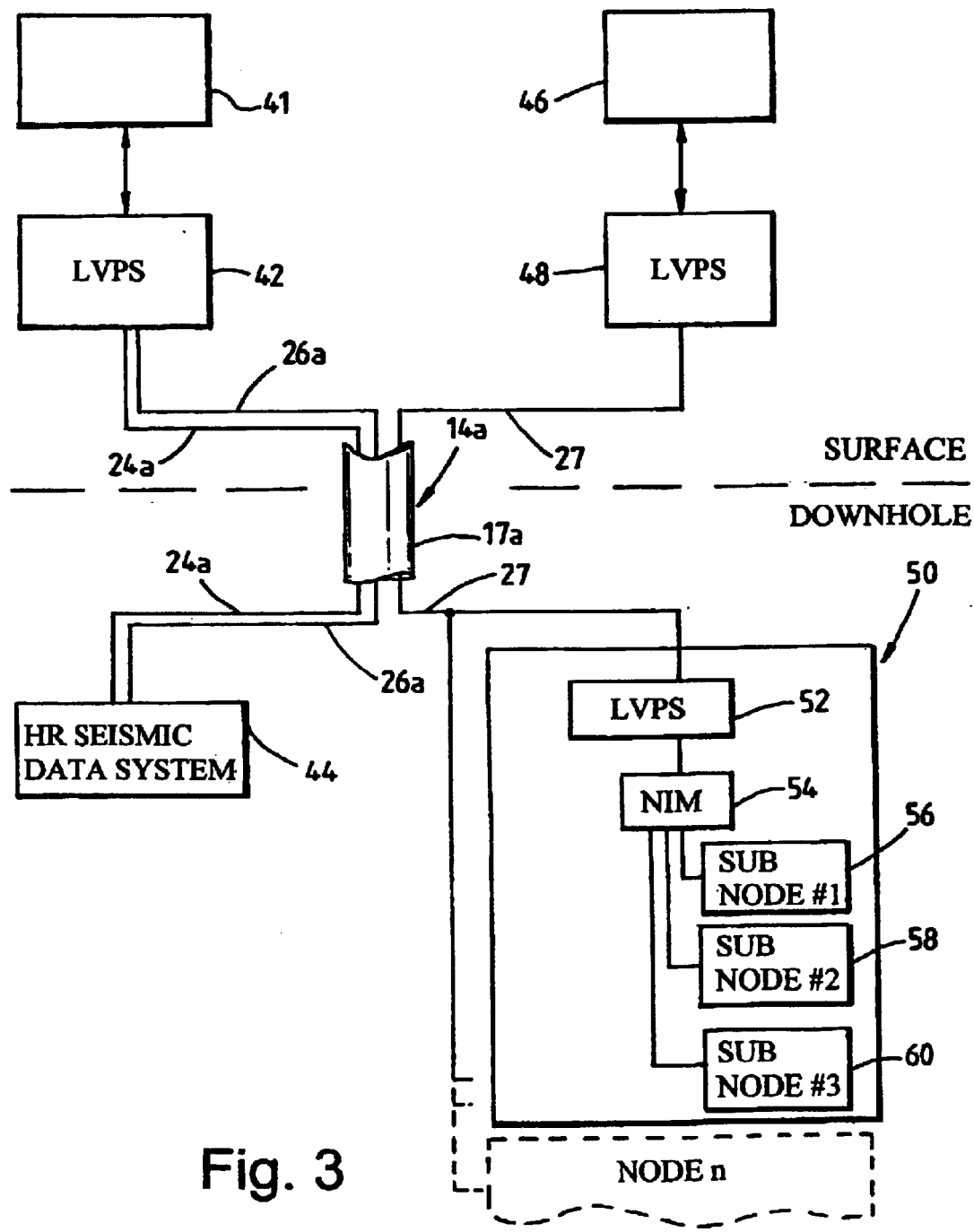
FIG. 3 is a schematic block diagram of a downhole in-well system configuration for running simultaneous high data rate monitoring and low data rate monitoring using the cable of FIG. 2.

Reference is now made to FIG. 3 of the drawings which depicts a schematic block diagram of a system configuration for running simultaneous high data rate monitoring with low data rate monitoring. The system has a high data rate monitoring configuration for seismic data etc. which comprises a high rate CCDACM 41 coupled to a low voltage power supply 42. The high data rate signals and low voltage power are coupled to a downhole seismic system 44 on conductors 24a,26a. The low data rate monitoring configuration is similar to that described above with reference to monitoring system of FIG. 1 and includes a low rate CCDACM 46 and an associated low voltage power supply 48 which is shown coupled to downhole node 50 by single conductor 27 which carries, as described above, low voltage supply from surface, commands from the surface and data from the sub-nodes to the surface. The node 50 has a low voltage node power supply 52, a NIM 54 and three sub-nodes 56,58 and 60 coupled to the NIM 54. The sub-nodes contain monitoring devices such as pressure transducers, flowmeters and temperature sensors for generating low voltage low data rate signals for sending to CCDACM 46. The sheath 17a, shown in broken outline, is the earth return for the low voltage supplies 42,48. The low voltage low data rate system may be coupled to additional downhole nodes, up to 255 nodes, depending on the capacity of the power supply.

Various modifications may be made to the aforementioned embodiment without departing from the scope of the invention. Although a downhole valve element is used and driven by the high voltage power supply, other downhole elements may be used, such as a pump or motor or the like. A mixture of downhole elements, such as valves, pumps and other elements requiring relatively high current and voltage may be used. Similarly, a variety of sensors may be used to monitor the position or other parameter of the downhole elements, such as temperature or pressure. Consequently, the downhole sensors may be pressure transducers, flowmeters, vibration sensors, seismic sensors, temperature sensors or the like. Although a single high voltage conductor and a separate single low voltage conductor are disclosed, it will be appreciated that more than one high voltage conductor and more than one low voltage conductor may be used, as long as there are separate conductors for the high voltage and low voltage supplies.

The use of a cable with a single high voltage conductor and a single low voltage conductor is generally sufficient and economic.

In the low voltage high data rate and low data rate applications a large number of respective downhole high data rate and low data rate nodes can be supplied from low voltage power supplies.

An advantage of the present invention is that an in-well flow control system is provided which can be used to supply high voltage power to up to 255 different downhole devices from a single power supply source. The separation of the high voltage and the low voltage power supplies enables standard components to be used with minimal voltage stress because high voltage is supplied to a downhole element such as a valve only when required, instead of being continuously supplied. A further advantage of this arrangement is that the system can be powered up during deployment of valves, pumps and the like which allows continuous monitoring during deployment using the low voltage line. A further advantage of the arrangement is that the high voltage is scalable on demand to increase power up to about 600V or the voltage limitation ability of the conductor. The system can easily be modified for shallower or deep wells simply by changing the type of cable used. The use of a cable with separate conductors for low voltage and high voltage also permits the cable to be used on other applications; to provide simultaneous high data rate monitoring and low data rate monitoring using low voltage power supplies and using the cable sheath as the power supply earth return. Thus a single cable type can be used for different applications.

What is claimed is:

1. An in-well flow control and monitoring system for controlling a plurality of electrically operable downhole elements from a surface power supply, said system comprising:

a high voltage power supply;

a low voltage power supply;

at least one high voltage downhole component and at least one low voltage downhole component;

a cable having at least two separate conductors and an earth return, said at least two separate conductors including a first conductor for coupling the high voltage power supply to the at least one high voltage downhole component and a second conductor for connecting the low voltage power supply to the at least one low voltage downhole component, monitoring means coupled to the at least one high voltage downhole component for monitoring when a high voltage is required to actuate said at least one high voltage downhole component, and means for supplying said high voltage to said at least one high voltage downhole component in response to a signal from said monitoring means.

2. A system as claimed in claim 1 wherein the earth return comprises cable sheathing.

3. A system as claimed in claim 1 wherein the earth return comprises a separate earth return conductor disposed within the cable so that said cable has three separate conductors; said first conductor; said second conductor, and said earth return conductor.

4. A system as claimed in claim 1 wherein the high voltage power supply is greater than 400 volts DC.

5. A system as claimed in claim 1 wherein the control and monitoring system further comprises a plurality of sensors and valve controllers coupled to one of said conductors for addressing said system.

6. A system as claimed in claim 5 wherein the flow control and monitoring system is used to control up to 255 downhole elements, from said one conductor and respective power supply.

7. A system as claimed in claim 1 wherein said low voltage monitoring means for monitoring said high voltage downhole component is coupled to a position transducer for monitoring a position of the high voltage downhole component.

8. A system as claimed in claim 1 wherein the high voltage downhole component is a valve including a valve element rotatable between an open and a closed position.

9. A system as claimed in claim 1 wherein the monitoring means is an optical transducer for optically monitoring a position of said downhole valve element.

10. A method of operating an in-well flow control system having a plurality of downhole low voltage components, said method comprising the steps of, providing separate high voltage and low voltage power supplies, coupling said high voltage and low voltage power supplies to respective downhole high voltage components and low voltage components over separate electrical conductors, monitoring said high voltage components to determine the requirement for high voltage to be supplied and providing a monitoring signal indicative of whether power is required, and supplying high voltage to said high voltage downhole components when said monitoring signal indicates high voltage is required.

11. A method as claimed in claim 10 wherein the method includes the step of using a cable sheath as an earth return.

12. A method as claimed in claim 10 wherein the method includes the step of using a separate conductor disposed within the cable as an earth return.

13. A method as claimed in claim 10 comprising the further steps of providing a valve including a valve element and the downhole component monitoring the position of the valve element to determine the requirement for high voltage power to be supplied to said downhole component.

14. A method as claimed in claim 10 wherein the method includes the further step of providing a variable surface power supply for varying power at surface to the downhole high voltage and low voltage power supplies.

15. A method as claimed in claim 13 wherein the method includes the step of continuously monitoring the position of the valve element using the low voltage conductor during deployment of the high voltage downhole component.

16. A method as claimed in claim 10 wherein the method includes the step of scaling a surface high voltage power supply on demand to increase power to said high voltage downhole components.

17. A power supply for use with an in-well flow control and monitoring system, said power supply comprising:

a separate high voltage power supply;

a separate low voltage power supply;

a cable having at least two separate conductors, a first conductor for coupling the high voltage power supply to high voltage components disposed downhole, and a second conductor for connecting the low voltage power supply to low voltage components disposed downhole.

18. A power supply as claimed in claim 17 wherein said cable further includes a conductive sheath used as an earth return for shallower wells.

19. A power supply as claimed in claim 17 wherein said cable further includes a separate conductor used as an earth return for deep wells.

20. A power supply as claimed in claims 17 wherein said high voltage power supply is scalable to provide increased high voltages on demand.

21. A monitoring system for simultaneously monitoring high data rate and low data signals from downhole sensors, said system comprising:

a high data rate system configuration;

a low data rate system configuration;

a cable in electrical communication with both high data rate configuration and said low data rate configuration, said cable comprising a conductive sheath, a first conductor for carrying a low voltage supply and low data rate signals, at least two second conductors for carrying a low voltage supply and high data rate signals, the high date rate system configuration having a surface control unit coupled to at least one high data rate downhole monitoring system by said at least two second conductors;

the low data rate system configuration having a surface control unit coupled to at least one low data rate downhole monitoring node system by said first conductor, said conductive sheath being an earth return for low voltage power supplies for the high data rate and low data rate system configurations.

22. A system as claimed in claim 21 wherein the cable further includes three conductors and a conductive armoured sheath.

* * * * *